(12) United States Patent
Foschiano et al.

(10) Patent No.: US 7,480,251 B2
(45) Date of Patent: *Jan. 20, 2009

(54) SYSTEM AND METHOD FOR DETECTING UNIDIRECTIONAL LINKS

(75) Inventors: Marco Foschiano, San Jose, CA (US);
Hei Tao Fung, Santa Clara, CA (US);
Alagu Annaamalai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 10/860,816

(22) Filed: Jun. 4, 2004

(65) Prior Publication Data

US 2004/0218540 A1  Nov. 4, 2004

Related U.S. Application Data

(63) Continuation of application No. 09/386,534, filed on Aug. 30, 1999, now Pat. No. 6,765,877.

(51) Int. Cl.
*H04L 12/26* (2006.01)

(52) U.S. Cl. ...................................... 370/248; 370/250

(58) Field of Classification Search .......... 370/242–251
See application file for complete search history.

(56) References Cited

U.S. PATENT DOCUMENTS

| | | | |
|---|---|---|---|
| 5,608,729 A | 3/1997 | Orsic | |
| 5,914,938 A | 6/1999 | Brady | |
| 5,933,602 A * | 8/1999 | Grover | 709/224 |
| 5,940,376 A * | 8/1999 | Yanacek et al. | 370/250 |
| 5,959,968 A | 9/1999 | Chin | |
| 6,032,019 A * | 2/2000 | Chen et al. | 725/124 |
| 6,195,351 B1 | 2/2001 | Hiscock | |
| 6,230,218 B1 | 5/2001 | Casper | |
| 6,240,446 B1 | 5/2001 | Casper | |
| 6,272,113 B1 | 8/2001 | McIntyre | |
| 6,314,108 B1 | 11/2001 | Ramasubramani | |
| 6,357,007 B1 | 3/2002 | Cromer et al. | |
| 6,388,995 B1 | 5/2002 | Gai | |
| 6,754,622 B1 * | 6/2004 | Beser et al. | 704/226 |
| 6,999,422 B2 * | 2/2006 | Ishioka | 370/238 |
| 7,085,238 B2 * | 8/2006 | McBeath | 370/249 |
| 2008/0117829 A1 * | 5/2008 | Nakano et al. | 370/247 |

OTHER PUBLICATIONS

Katz (www.ietf.ort) "Three way handshake for IS-IS Point-to-Point Adjacencies", Mar. 1999, 6 pages.

* cited by examiner

*Primary Examiner*—Chi H. Pham
*Assistant Examiner*—Thai D. Hoang
(74) *Attorney, Agent, or Firm*—Cindy Kaplan (57) ABSTRACT

A method of testing a primary device for two-way communication between the primary device and one or more other devices in communication therewith in a network is disclosed. The method includes inserting into an echo packet an originating device identifier in an originating device field and a primary device identifier in a primary device field, and transmitting the echo packet from the primary device. Two-way communication is detected if a reply packet received at the primary device contains the originating device identifier in the originating device field and the primary device identifier in the primary device field. A system for testing a primary device for two-way communication between the primary device and neighbor devices coupled to the primary device is also disclosed.

22 Claims, 12 Drawing Sheets

| Name | Type | Value format |
|---|---|---|
| Device-ID TLV | 0x0001 | ASCII character string |
| Port-ID TLV | 0x0002 | ASCII character string |
| Echo TLV | 0x0003 | List of ID pairs |
| Message Interval TLV | 0x0004 | 8 bit unsigned integer |
| Timeout Interval TLV | 0x0005 | 8 bit unsigned integer |
| Device Name TLV | 0x0006 | ASCII character string |

SYSTEM AND METHOD FOR DETECTING UNIDIRECTIONAL LINKS

RELATED APPLICATION

This patent application is a continuation of U.S. patent application Ser. No. 09/386,534, filed Aug. 30, 1999, which is incorporated herein by reference in its entirety.

BACKGROUND OF THE INVENTION

1. Field of the Invention

The present invention relates generally to methods and apparatuses for detecting system configuration errors within a network, and more specifically, to methods and apparatuses for detecting unidirectional links between devices configured for communication with one another in the network.

2. Description of the Related Art

In a network of coupled devices, or a collection of such networks, devices are arranged for two-way communication with neighboring devices to send frames to and receive frames from the neighboring devices. A one-way (unidirectional) connection between devices may result from a faulty transmitting or receiving line, miswiring of fiber strands (FIG. 1), port interface malfunctions (FIG. 2), or physical media converter failures, for example. A single unidirectional error between two devices can lead to errors such as spanning tree loops, which may affect the entire network.

Figure 1:
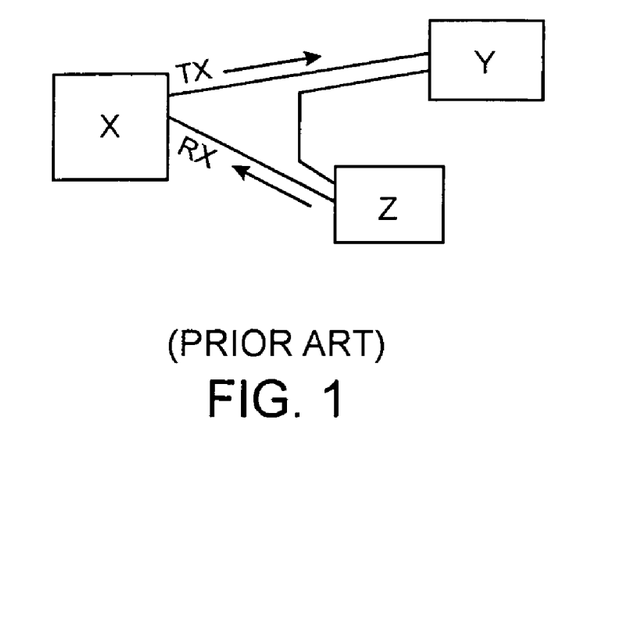
FIG. 1 is a schematic showing a miswired connection between devices within a network.
Figure 2:
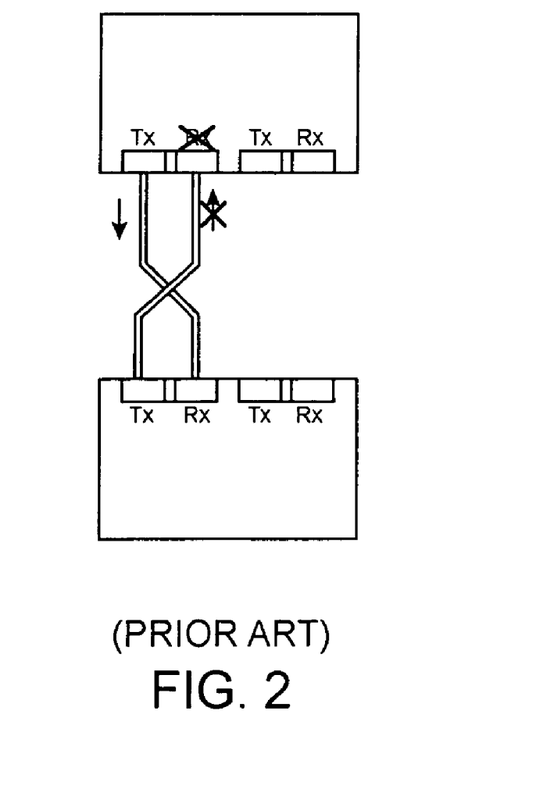
FIG. 2 is a schematic showing a connection between two devices with one of the devices having a port malfunction.

An example of a unidirectional connection is shown in FIG. 1. The transmitting line TX correctly goes from device X to device Y. The receiving line, however, is miswired. Rather than providing a communication link directly from device Y to device X, the receiving line goes from device Y to device Z and then through device Z to device X. In this configuration, each device can properly send a packet to a neighboring device but it cannot receive a packet from the same device to which it transmitted the packet. This lack of mutual identification among the neighboring devices can result in an incorrect assumption by the transmitting device that the transmitter and receiver at the other end are in two-way communication. This type of miscommunication can lead to problems in the operation of the spanning tree protocol and generate a flooding of packets on the network.

Network systems typically check for miswiring or unidirectional problems at the physical layer of an OSI (Open Systems Interconnection) reference model. The physical layer defines the actual physical components such as connectors and cables. A unidirectional link test at the physical layer only checks for open lines or port malfunctions and would not detect a miswired system as shown in FIG. 1. One example of a physical layer unidirectional check is an auto-negotiation start-up protocol. In operation, a local device begins the test by transmitting its link code word with an acknowledge bit not set. Once three consecutive, consistent link code words have been received at the local device, the auto-negotiation system looks for three consecutive, consistent link code words which have the acknowledge bit set to 1. After a period of time the auto-negotiating system is then able to transmit and receive data, assuming the partner device also received three consecutive, consistent link code words followed by three consecutive, consistent link code words with the acknowledge bit set to 1. If the start-up protocol does not succeed, no communication is established between the neighbors.

As can be observed from the above description, the auto-negotiation protocol only checks whether the device receives an acknowledgement back after transmitting data. It does not identify the device from which it received the acknowledgement or confirm that the device the data was received from and the device the original link code word was transmitted to, are the same device, since the physical layer has no addressing. In the example of the miswired network shown in FIG. 1, no error would be detected at the physical layer since each line is connected to a computer at the input and output ports with a continuous link from the output port of device Y to the input port of device X, even though it is through a separate device. As discussed above, this type of unidirectional error can lead to malfunctions in critical system protocols.

There is, therefore, a need for a unidirectional link detection protocol which provides for the identification of logical one-way miscommunication between neighbors even when the physical layer has identified the transmission media as bidirectional.

SUMMARY OF THE INVENTION

The present invention provides a method and system for detecting one-way communication between devices configured for communication with one another in a network.

A method of testing a primary device for two-way communication between the primary device and one or more other devices in communication therewith in a network. The method generally comprises: inserting into an echo packet an originating device identifier in an originating device field and a primary device identifier in a primary device field; transmitting the echo packet containing the originating device identifier and the primary device identifier from the primary device; and receiving a reply packet at the primary device and detecting two-way communication if the reply packet contains the originating device identifier in the originating device field and the primary device identifier in the primary device field.

A system for testing a primary device for two-way communication between the primary device and the other devices coupled to the primary device is also disclosed. In one aspect of the invention the system generally comprises: a message generator operable to generate an echo message with an originating device identifier located in an originating device field and a primary device identifier located in a primary device field; a transmitter operable to transmit from the primary device the echo message containing the originating device identifier and the primary device identifier; and a receiver operable to receive a reply packet at the primary device and detect two-way communication if the reply packet contains the originating device identifier in the originating device field and the primary device identifier in the primary device field.

In one embodiment, the messages are transmitted and received across a data link layer. The primary device may also include a cache table for storing the originating device identifier. The cache table is used to provide an up to date list of neighboring devices in communication with the primary device. Preferably, the system runs continuously for early detection of failures in the communication links of the network.

The system may be configured to identify not only a unidirectional link condition between two devices, but also the specific type of error in the system, such as a transmitting/receiving loop or a neighbor mismatch error. The system may also generate and send an error message to the primary device user, network management, or both.

The above is a brief description of some deficiencies in the prior art and advantages of the present invention. Other features, advantages, and embodiments of the invention will be apparent to those skilled in the art from the following description, drawings and claims.

BRIEF DESCRIPTION OF THE DRAWINGS

Corresponding reference characters indicate corresponding parts throughout the several views of the drawings.

DETAILED DESCRIPTION OF THE INVENTION

Figure 3:
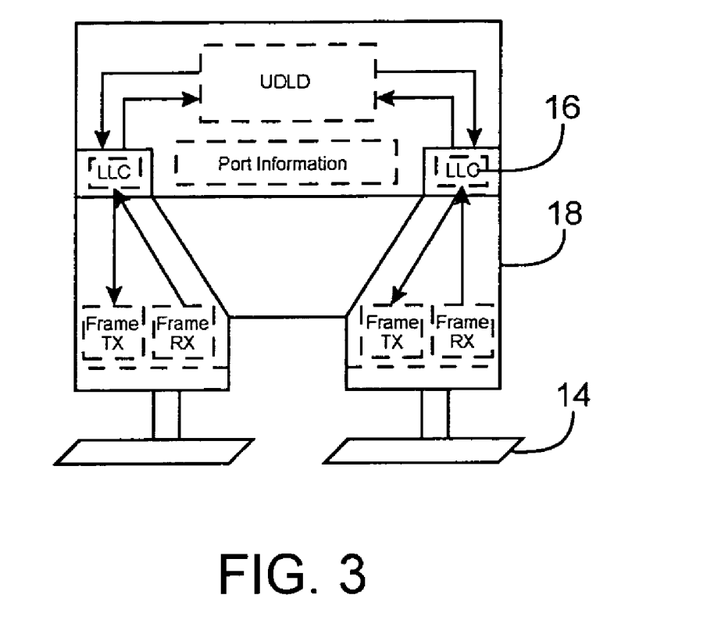
FIG. 3 is a schematic showing a unidirectional link detection protocol of the present invention.

Referring now to the drawings, and first to FIG. 3, a diagram illustrating a unidirectional link detection protocol operating on an OSI (Open Systems Interconnection) reference model is shown. The OSI reference model defines a layered architecture which categorizes and defines protocols for communication between end systems. The OSI model comprises seven layers, each specifying particular network functions. Upper layers (application, presentation, and session layers) of the model deal with application issues and are generally implemented only in software. Lower layers (transport, network, data link, and physical layer) handle data transport issues. The physical layer 14 defines the electrical, mechanical, procedural, and functional specifications for activating, maintaining, and deactivating the physical link between communicating network systems. Rather than running on the physical layer as do conventional error detection systems, the unidirectional link detection system of the present invention runs over the data link layer to provide a more thorough and accurate test of the system. The data link layer is just above the physical layer and defines how data is packaged for transport over the physical network. The main task of the data link layer is to take a raw transmission facility and transform it into a line which appears free of undetected transmission errors to a network layer. The data link layer is subdivided into a logical link control sublayer (LLC) 16 and media access control (MAC) sublayer 18. The MAC sublayer 18 defines the media access method and the LLC sublayer 16 provides a way to pass information between different network types by repackaging the data with new headers.

Figure 4:
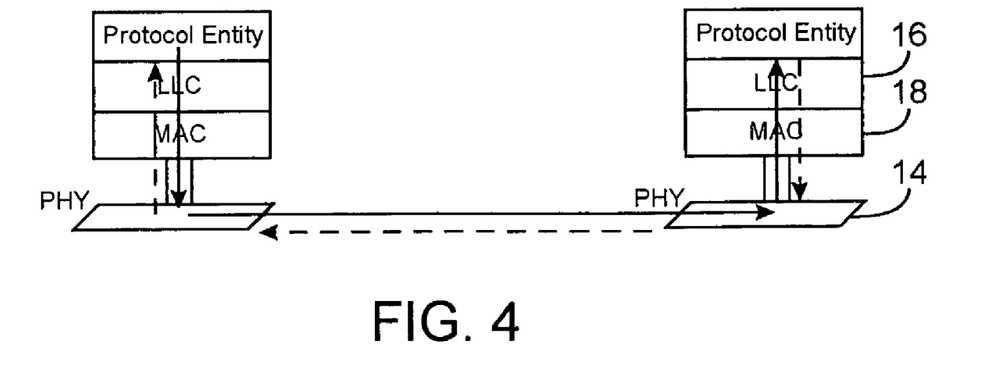
FIG. 4 is a schematic showing logical paths between protocol entities of an OSI reference model.

Communication between computers within the network is made possible with the use of communication protocols, which govern how computers exchange information over a network (FIG. 4). In order for proper operation of the protocols, it is important that the devices in the network are properly interconnected so that error free communication can occur across the network. The unidirectional link detection system is used to ensure that there is bidirectional communication between two neighboring computers or devices within the network. The system detects and disables one way communication before it interferes with the operation of other network protocols and creates problems within the network system. The unidirectional link detection system may be used to detect one-way connections on a point-to-point media such as Ethernet interfaces using fiber media, for example. The system may also be used to detect unidirectional connections on other types of networks and with other types of transmission media such as twisted pair or coaxial cable. Miswiring is, however, more common with fiber optic cable since the cables are often mechanically spliced or fused rather than attached with a connector.

Figure 5:
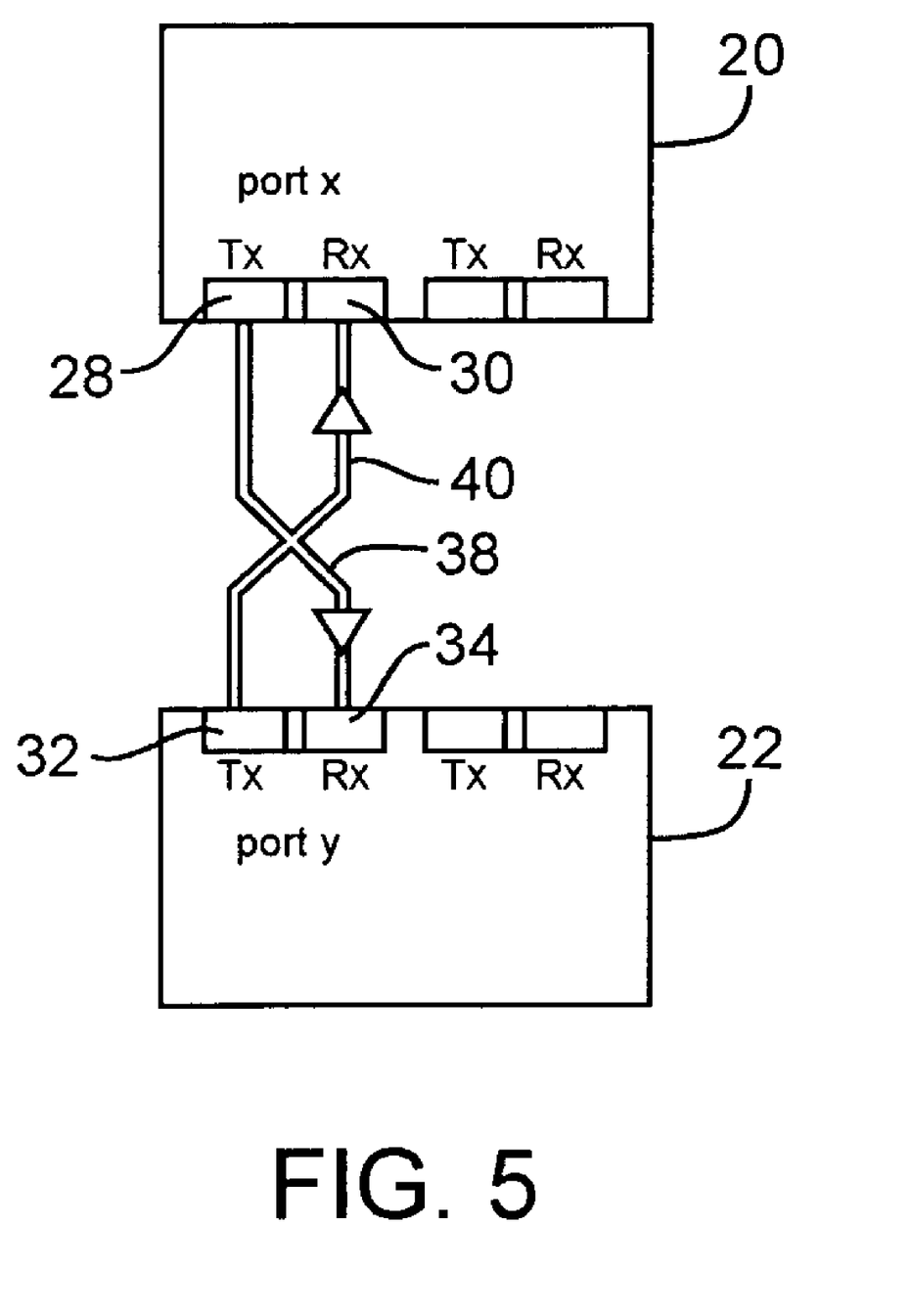
FIG. 5 is a schematic showing two computers properly wired for bidirectional communication.

FIG. 5 schematically illustrates two computers (devices) 20, 22 arranged for communication with one another. Each device 20, 22 includes two pairs of ports each having two connectors. Typically each port communicates with a different device. Each port includes a transmitting connector (Tx) and a receiving connector (Rx). Device 20 includes a port x having a transmitting connector 28 and a receiving connector 30. Port x of device 20 is in bidirectional communication with port y of device 22 which includes a transmitting connector 32 and a receiving connector 34. As shown in FIG. 5, device 20 transmits data from transmitting connector 28 to receiving connector 34 of device 22 over line 38 and device 20 receives data at receiving connector 30 from transmitting connector 32 of device 22 over line 40.

In the following description of the unidirectional link detection system, computer 20 will be referred to as the primary device and the computer 22 will be referred to as the neighbor (secondary) device. The operational description will be from the point of view of the unidirectional link detection system running on computer 20 and checking the connection between computers 20 and 22. In the following description, the neighbor computer 22 is also running the unidirectional link detection protocol. For simplification, the system is described as testing one communication link between two computers. It is to be understood that the unidirectional link detection system may be used to check multiple communication links between any number of computers, hubs, switches, or other devices arranged in various configurations within a network.

The unidirectional link detection system operates in three phases. The first is a linkup phase. During linkup phase a fast train of messages is sent in order to try to synchronize the neighbors as soon as possible. The second phase is an advertisement phase for continuously monitoring the communication links between the device and its neighbors. The information gathered while in advertisement phase is stored in a cache table which is continuously updated to provide up to date information on the location and status of neighbor devices. The third phase is a detection phase which is run on the communication link between devices 20 and 22 upon any of the following events: start up of the neighbor device 22; coupling of device 22 to device 20, which results in detection of a new neighbor at device 20; or receipt of a resynchronization request from a neighbor device 22.

Figure 11:
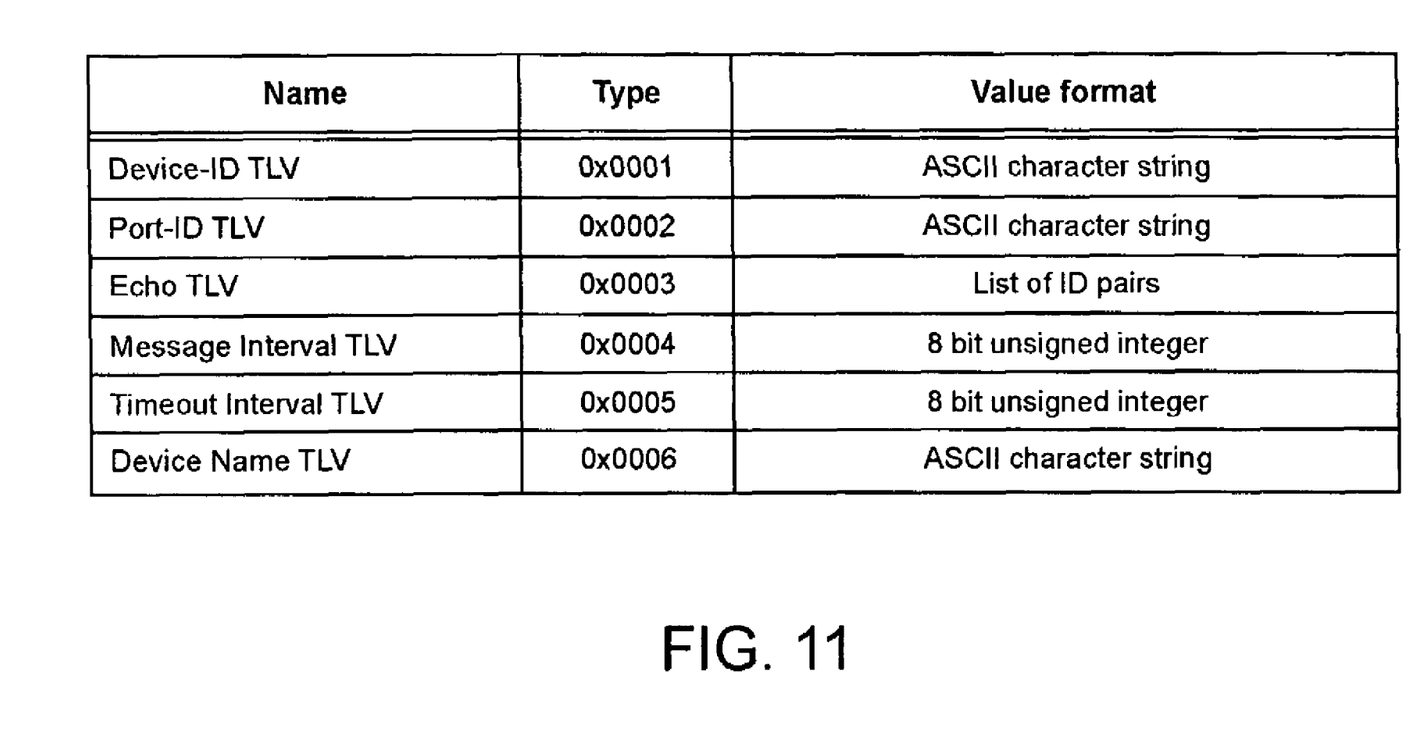
FIG. 11 is a data list diagram showing the type and value format of the fields of a packet of the unidirectional link detection protocol.

The following description of the three phases includes reference to message sections of a unidirectional detection message shown in FIG. 11. The device ID and port ID correspond to the Device-ID TLV and Port-ID TLV, respectively. The device/port ID pair corresponds to the Echo TLV. As further described below, a TLV is a section of the message that has the property of being variable length and variable type.

Figure 6:
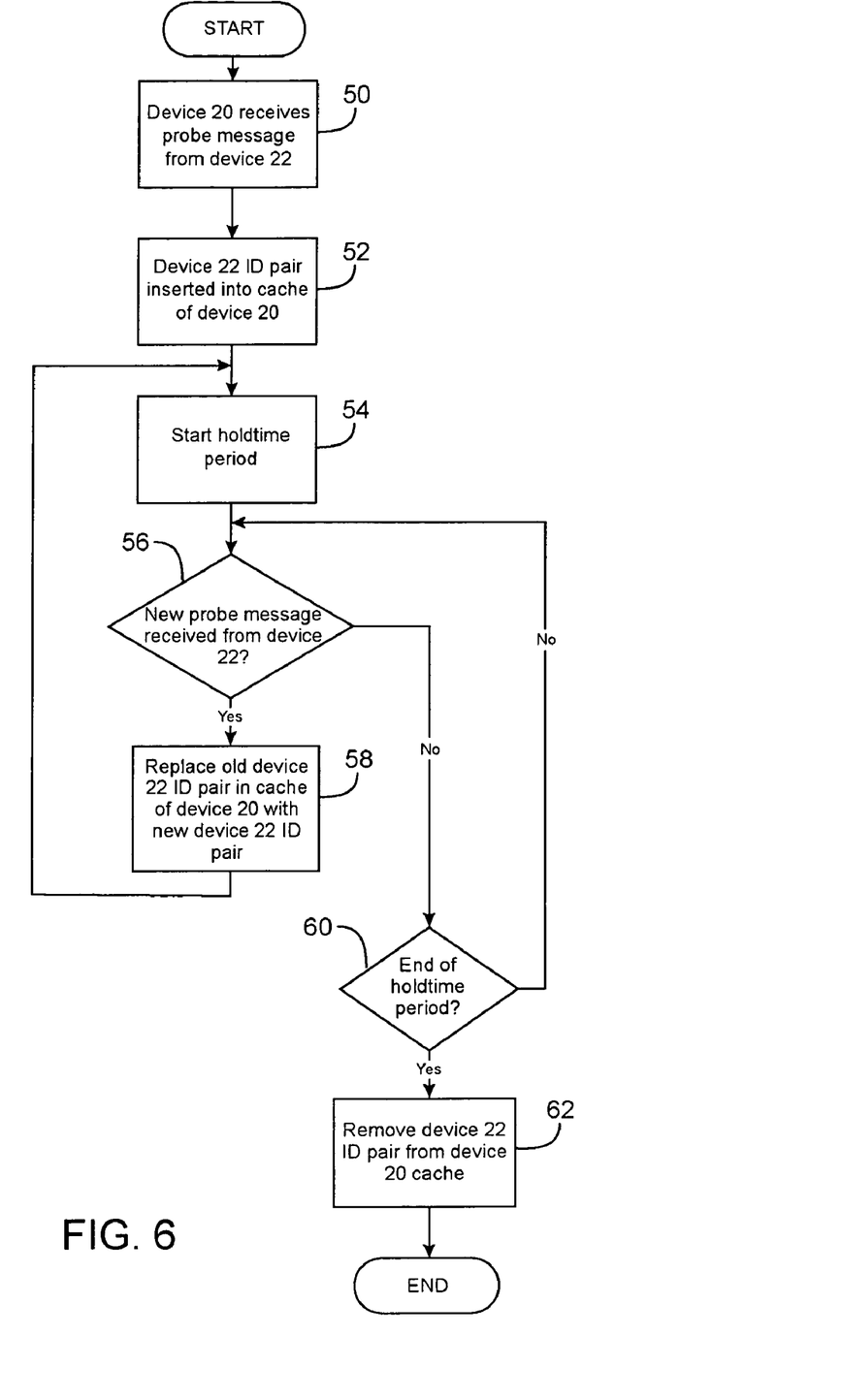
FIG. 6 is a process flow diagram illustrating a process of identifying neighbor devices and updating a cache table containing a list of neighbor devices.

To begin advertisement phase, each device capable of bidirectional communication sends a unidirectional link detection message (probe message). The probe message contains the device ID and port ID of the device from which it originated. The probe message is sent out by all devices to their neighbor devices to inform them that they are unidirectional link detection capable. For example, once the device 20 learns about the neighbor device 22 it stores information (e.g., location and status of device 22) in a cache table and periodically checks to ensure that the bidirectional connection between devices 20 and 22 is still intact and operational. FIG. 6 is a flow diagram illustrating the process for keeping the cache table up to date with information on the neighbor devices. The unidirectional link detection system of each device periodically (e.g., every 20 seconds) sends a probe message to each interface to keep each device informed about its neighbor. The interval between probe messages (message interval) may vary. For example, a probe message may be sent every seven seconds for twenty-eight seconds, and then sent every sixty seconds if the link has been determined to be bidirectional during detection phase (described below). Alternatively, the message interval may remain at seven seconds so that the system can react quickly to network topology changes.

Upon receipt of the probe message at device 20 from device 22 (step 50), an identifier for device 22 is inserted into the cache table of device 20 (step 52). The identifier remains in the cache table for a period of time called a holdtime (step 54). At the end of the holdtime (e.g., 21 or 180 seconds) the cache entry is considered stale and is aged out (steps 60 and 62). If a new probe message is received from device 22 before the identifier is aged out, the identifier will be replaced with a new identifier from the new probe message (steps 56 and 58). The holdtime is reset whenever the identifier is replaced.

Figure 7:
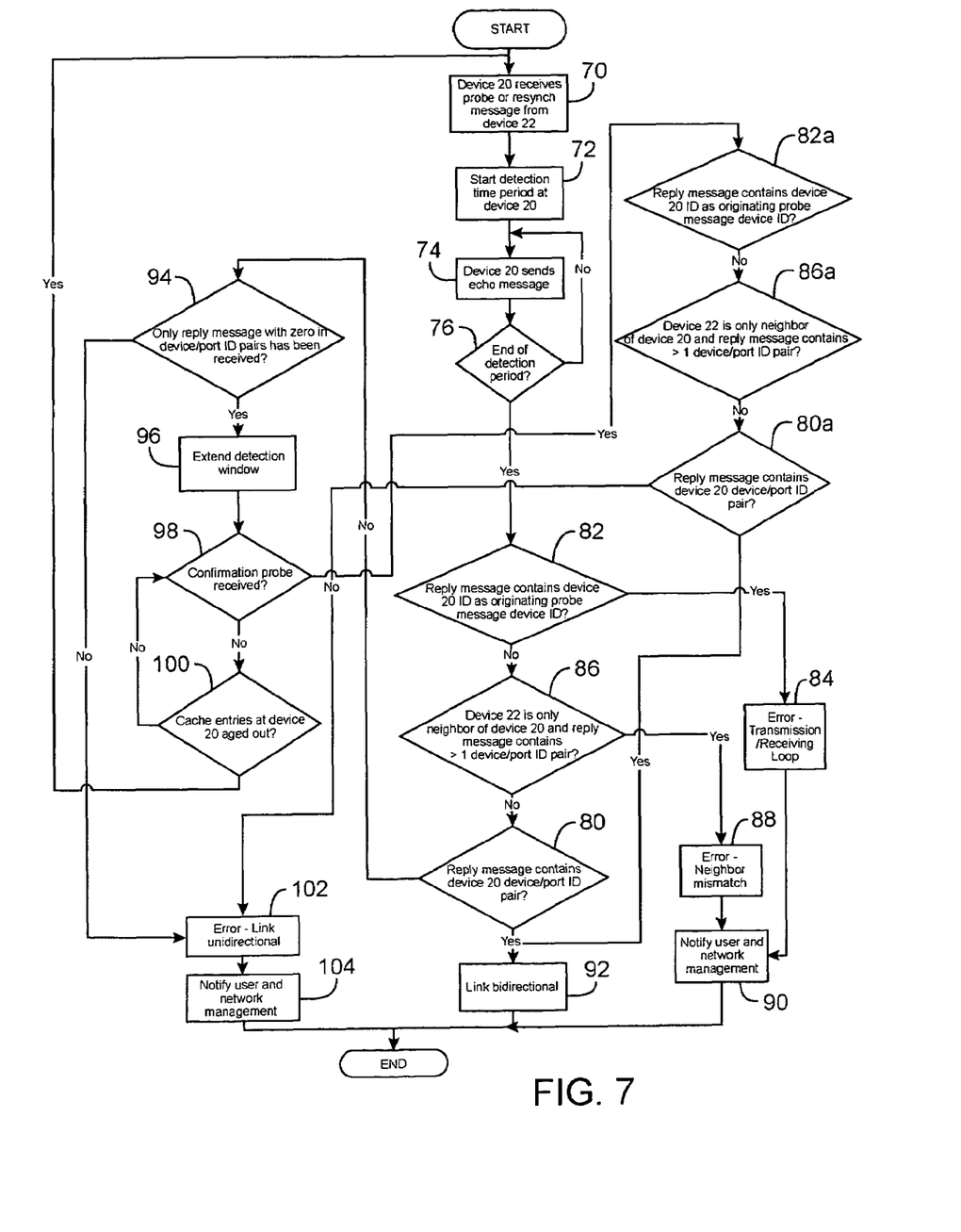
FIG. 7 is a process flow diagram illustrating a detection process of the unidirectional link detection protocol.
Figure 8:
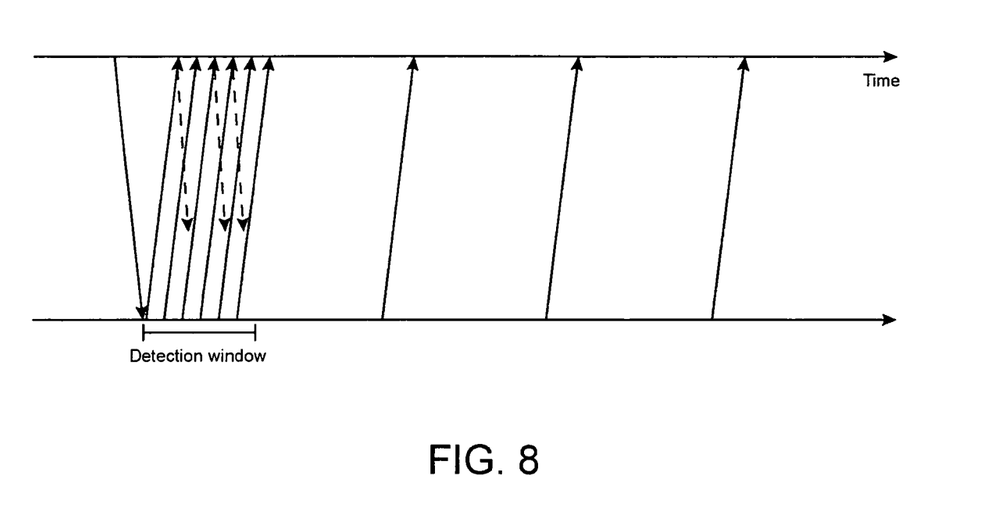
FIG. 8 is a time line illustrating a detection window of the unidirectional link detection protocol.

FIG. 7 is a process flow diagram illustrating the detection process of the unidirectional link detection system of device 20. The detection process begins upon receipt of a first non-flush message or of a resynchronization message from device 22 (step 70). The probe message contains the device 22 ID, which is also called the originating identifier since it identifies the device from which the probe message originated. Upon receipt of the message, device 20 begins a detection time period and sends an echo message back to device 22 (steps 72 and 74). The echo message contains the device ID and port ID of computer 20 (device/port ID pair) and the device ID and port ID from which the neighbor's message originated from (device 22). The echo message may be sent every one second, for example, until the end of the detection time period (steps 74 and 76). The number of echo messages sent should be sufficiently large so that at least one message gets through the link and reaches the other end, since some of the messages might be dropped during the transmission. For example, in FIG. 8 the arrows with dotted lines denote messages which are lost during transmission in the detection window. The detection period may last between four and six seconds, for example. Similarly, upon receipt at device 22 of any non-flush message from device 20, the unidirectional link detection process of device 22 is started and it sends the information in the received message back to device 20 in an echo message (FIGS. 5 and 7). Once this reply message is received at device 20 the message is checked to see if it includes the device 20 device/port ID pair (step 80) and to make sure that it does not contain the device 20 device/port ID pair in the originating device location (step 82). If no reply message is received, the link is declared unidirectional (step 102).

If during the detection window of port x of device 20 one of the following conditions is met, device 20 will declare port x to be unidirectional:

(1) no echo message with the device 20 device/port ID pair in the echo TLV has been received by device 20 (e.g., due to a misconfigured transmitting or receiving lines 38, 40 or malfunctioning hardware causing a local one way connection condition) (step 80);

(2) at least one echo message was received containing the device 20 ID in the originating device location where device 22 ID should be located (e.g., due to a loop between the transmitting connector 28 and the receiving connector 30 on the same port x) (steps 82-84); or (3) there has always been only one neighbor of port x listed in the cache table of device 20 and this neighbor has sent at least one unidirectional link detection message containing more than one device/port ID pair (e.g., shared media environment with neighbor mismatch condition) (steps 86-88).

If any of the above conditions occurs, the link is declared unidirectional and the user and the network management are notified (steps 90 and 104). A message such as "Unidirectional link detection on port xx" is preferably displayed on a display screen (not shown) of device 20 to warn a user of the device of the error. The user may then choose what corrective action to take. Another option is for the port on the one way link to be automatically disabled or changed into a special state by the unidirectional link detection system in order to avoid logical loops. In this case, a warning message such as "As a precautionary measure port xx has been disabled" may also be displayed to the user. Management applications should be informed of the misconfiguration and of the corrective action taken. In a shared media environment, specific notations may also be displayed to pinpoint every unidirectional path between a local port interface and remote neighbors. The displayed notification would include the device name string.

If at step 80 a reply message is received with zero pairs in the device/port ID pair location, the detection time period is extended until either a confirmation message is received or the cached entries in the device 20 are aged out (steps 94-100). The confirmation message is a message that has a non-empty device/port ID pair in the Echo TLV, that is a non-flush message and that doesn't cause the detection to be restarted. During this extended window, regular probes should be sent out periodically. The period should match the shortest advertisement interval used by the system in advertisement mode. If a confirmation message is received, the detection period will end and the link will be declared either unidirectional or bidirectional (steps 80a, 82a, 86a). If no confirmation message is received, the test will end when all the entries in the cache table have aged out and the phase will be set to advertisement phase (step 100).

If the unidirectional link detection system determines that none of the above conditions exist and the reply message met all the criteria noted in steps 80, 82, and 86 the link will be considered bidirectional (step 92).

The length of the detection time period for each device is preferably adjusted to match a neighbor's detection period, if different detection periods are used. Since there may by multiple neighbors which may be discovered sequentially, it is preferable to use a detection window shorter than the time needed by a spanning tree protocol to go forward. The spanning tree protocol default time is preferably greater than 8 seconds, and may be 30 seconds, for example.

Upon startup (linkup), the detection algorithm should stabilize quickly and the states of the cache tables of the neighbor devices should be set shortly after the start up. This is facilitated by sending N+three probe messages at one second intervals at start up time and by setting a resynchronization (RSY) bit in each message. N is the default number of echo messages sent during the detection phase. The RSY bit is used to resynchronize the neighbors' cache tables, and to detect a unidirectional link or potential network misconfiguration.

At shut down (linkdown) all the cache entries of the affected ports are flushed and a detection test of that port is cleared if the port had not previously been shut down due to a unidirectional connection.

If a user modifies the device ID or port ID while the unidirectional link detection system is running, the system preferably flushes the device's affected portion of the cache table, sends a flush message to all of the related neighbor devices, and restarts the linkup sequence for all the affected interfacing ports. During the detection or advertisement phases the unidirectional link detection system should also restart the linkup sequence if all the neighbors' cache entries become aged out. The linkup sequence will resynchronize the device with any potential out of sync neighbors.

If a resynchronization message is received during the detection phase, the detection should be restarted in order to allow the neighbor to resynchronize. The unidirectional link detection system preferably keeps track of the neighbors which have already triggered a resynchronization to avoid repeated detection restarts. On the receiver side this can be done by monitoring all the 0-to-1 transitions of the RSY bit in the messages received from the neighbors and stored in the cache. On the transmitter side, the neighbor which wants to trigger a resynchronization should force a 0-to-1 transition on the RSY bit and keep it for at least a few packets.

In the case where a flush message is received during the detection phase and because of it all the neighbors get aged out, the unidirectional link detection system should go to advertisement phase and the detection finite state machine should be reset to the unknown state. If a flush message is received but not all of the neighbors' cache entries get aged out, the unidirectional link detection system needs to rescan all applicable cache entries (skipping the ones with empty echo TLV or holdtime=zero) in order to update the current detection state.

Whenever an interface is disabled and the unidirectional link detection system is running, the unidirectional link detection system is disabled on an interface, or a device is reset, all existing cache entries for the interface affected by the configuration change are cleared. Also, the unidirectional link detection system sends at least one flush message to inform the neighbors to flush the part of their cache also affected by the status change. This is accomplished to keep the cache of each device aware of the status of all of the connected devices.

As discussed above, the unidirectional link detection system has three phases, linkup, advertisement, and detection. In addition to being in one of these three phases, the system may also be in an initialization, inactive, linkup, or port shut down state. Table 1 is a state transition table summarizing these six states and the transitions from one state to another. The events which can trigger a state transition are as follows:

A. Linkup when the unidirectional link detection system is enabled.
B. Linkdown.
C. Startup (enabling) of both unidirectional link detection system and port.
D. Disabling of either the unidirectional link detection system or the port on which it is running.
E. Discovery of a new neighbor or receipt of a resynchronization request.
F. End of detection period or interruption of detection period.
G. All neighbors aged out or the user manually changes the device ID or port ID.
H. Port which was previously disabled by unidirectional link detection system is enabled manually by user and unidirectional link detection system is active.
I. No unidirectional link detection message received during linkup phase.
J. Expiration of time interval between probe messages sent at linkup.
K. Expiration of time interval between echo messages, restart of detection, or extension of detection.

TABLE 1

| | Final State | | | | |
|---|---|---|---|---|---|
| Initial State | UDLD Inactive | Linkup | Advertisement | Detection | Port Shutdown |
| Initialization | B, D | A | — | — | — |
| UDLD Inactive | — | A, C | — | — | — |
| Linkup | B, D | J | I | E | — |
| Advertisement | B, D | G | — | E | — |
| Detection | B, D | G | F$^1$ | K | F$^2$ |
| Port Shutdown | D | H | — | — | — |

[1]The link was found bidirectional during detection.
[2]The link was found in a unidirectional, transmitting/receiving loop, or neighbor mismatch condition during detection.

Within the detection state there are five additional states: unknown; unidirectional link detected; bidirectional link detected; neighbor mismatch; and transmitting/receiving loop. The unknown state is reached from any of the other states when the unidirectional link detection system is disabled or a packet is received without device/port ID pairs (i.e., new packet from neighbor). The unidirectional link detected state is reached from either the unknown state or the neighbor mismatch state if a packet is received not containing the device's own device/port ID pair in the echo TLV. The bidirectional link detected state is reached from the unknown, unidirectional link detected, or neighbor mismatch states if a packet is received containing the devices own device/port ID pair. The neighbor mismatch state is reached from the unknown, unidirectional detected or bidirectional detected states when a packet is received from the device's unique neighbor and contains more than one device/port ID pair. The transmitting/receiving loop state is reached from the unknown, unidirectional detected, bidirectional detected, or neighbor mismatch state, if a packet is received with the device's own identifier in the originating device location which should contain the neighbor's identifier.

These detection states are summarized in Table 2 and the events triggering the transitions between states are as follows:

a. Packet received without any device/port ID pairs or detection disabled.
b. Detection disabled.
c. Packet received without the receiving device's device/port ID pair in the echo TLV.
d. Packet received with the receiving device's device/port ID pair in the echo TLV.
e. Packet received without the receiving device's device/port ID pair in the echo TLV, or packet received without echo TLV.
f. Packet received either with or without the receiving device's device/port ID pair in the echo TLV, or packet received without echo TLV.
g. Packet received with the primary device ID and the port ID in the originating device ID TLV and port ID TLV locations.
h. Primary device has only one neighbor and packet received containing more than one device/port ID pair in the echo TLV.
i. Primary device has only one neighbor and packet received containing more than one device/port ID pair in the echo TLV, or packet received without echo TLV.

TABLE 2

| Initial State | Final State | | | | |
|---|---|---|---|---|---|
| | Unknown | Unidirectional | Bidirectional | TX/RX Loop | Neighbor Mismatch |
| Unknown | a | C | d | g | h |
| Unidirectional | b | E | d | g | h |
| Bidirectional | b | — | f | g | h |
| TX/RX Loop | b | — | — | — | — |
| Neighbor Mismatch | b | C | d | g | i |

Figure 9:
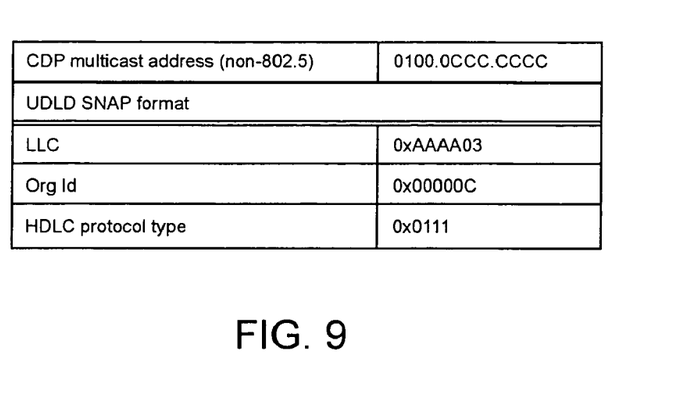
FIG. 9 is a unidirectional link detection packet format illustrating assigned field values.
Figure 10:
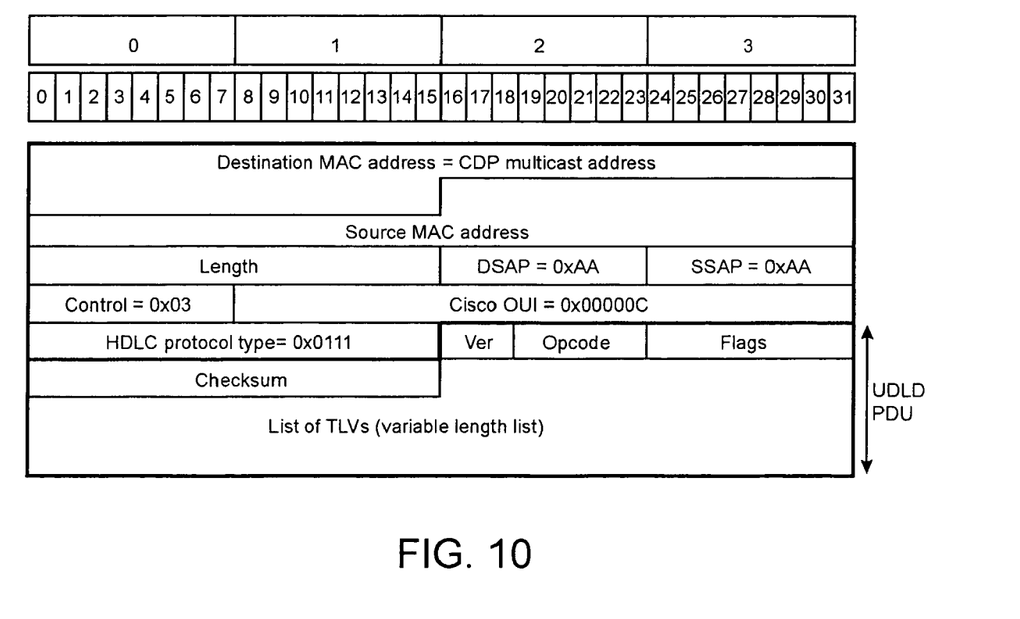
FIG. 10 is a packet diagram of the unidirectional link detection system.

Each of the packets sent and received by the unidirectional link detection system may comprise several fields. Each packet may be formed ("encapsulated") in a header specified by a protocol used on the network on which the packet is transmitted. The header may also comprise information about the packet, such as a packet length, a checksum, or other appropriate data. An example of a packet format is shown in FIGS. 9 and 10. FIG. 9 shows assigned field values and FIG. 10 shows a diagram of the packet. It is to be understood that the format of the packet and field descriptions may be different than those shown and described herein without departing from the scope of the invention.

A TLV format for the packet comprises a type field (16 bits), a length field (16 bits), and a value field (variable length). A TLV type list is shown in FIG. 11 and includes a device ID, port ID, echo, message interval, timeout interval, and device name. The unidirectional link detection protocol data unit field descriptions also include a recommended timeout flag, resynchronization (RSY) flag, and a protocol data unit checksum.

The device ID TLV uniquely identifies the device sending the unidirectional data link detection packet (e.g., originating device 22). The device ID preferably contains the device's media access control (MAC) address string, but may contain any other suitable device identifier. The port ID uniquely identifies the physical layer port from which the unidirectional data link detection packet is sent on and preferably contains the module#/port# string. The port ID is preferably sent along with the device ID to identify the specific port of the device from which the message originated. The device ID and port ID form the originating device identifier and are sent along with the original probe message and included in the echo messages.

The echo TLV contains a list of valid device/port ID pairs received by a port from all of its neighbors. The device/port ID pair is only included in the echo list if it was received in a unidirectional link detection message received and cached on the same interface on which the echo TLV is sent. If no unidirectional data link detection messages are received, the echo TLV is sent containing zero pairs (see step 94 of FIG. 7 and the related description provided above).

The message interval TLV is the time between the sending of probe messages after the linkup or detection phases and the time between the sending of echo messages during detection phase. The time period of the message interval is preferably between seven and ninety seconds, and may be sixty seconds, for example. The message interval may also be variable and increase after the link is determined to be bidirectional, as previously discussed. In the detection phase, the message interval for sending echo messages is preferably one second. When the detection is extended in order to wait for a confirmation message, the message interval for sending echo messages is preferably chosen as the shortest advertisement interval used by the system in advertisement phase. The message interval is used to calculate the holdtime of a cache item (i.e., time after device ID message is received and stored in cache until the message is aged out). The holdtime is calculated as the message time interval multiplied by a holdtime to message interval ratio, which may be three for example.

The timeout interval TLV is used by the unidirectional link detection system to decide how long to wait before declaring a port to be unidirectional. The timeout interval is preferably between four and six seconds. Both the message interval and the timeout interval TLV are optional. The device name is used by a command line interface and typically contains a user-friendly device ID string.

The following are examples of possible configurations of unidirectional errors and methods for detecting the errors.

Figure 12A:
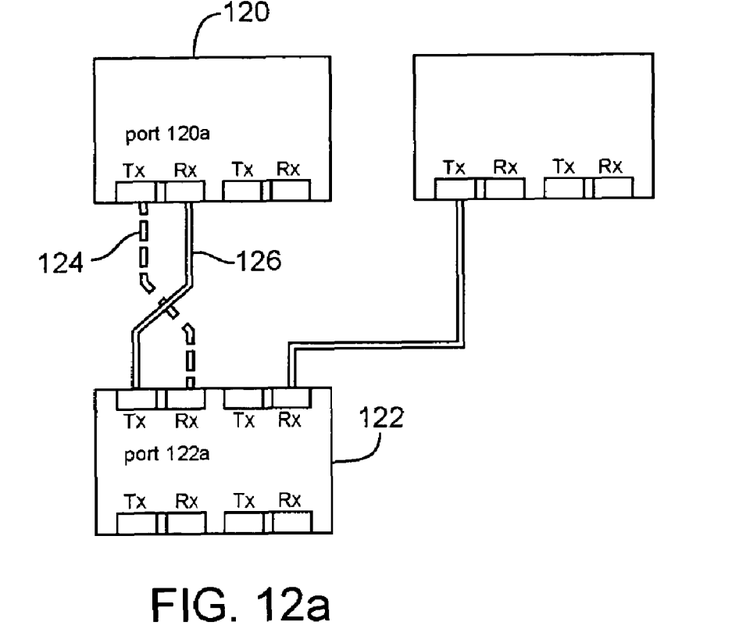
FIG. 12a is a schematic illustrating communication link connections between devices.
Figure 12B:
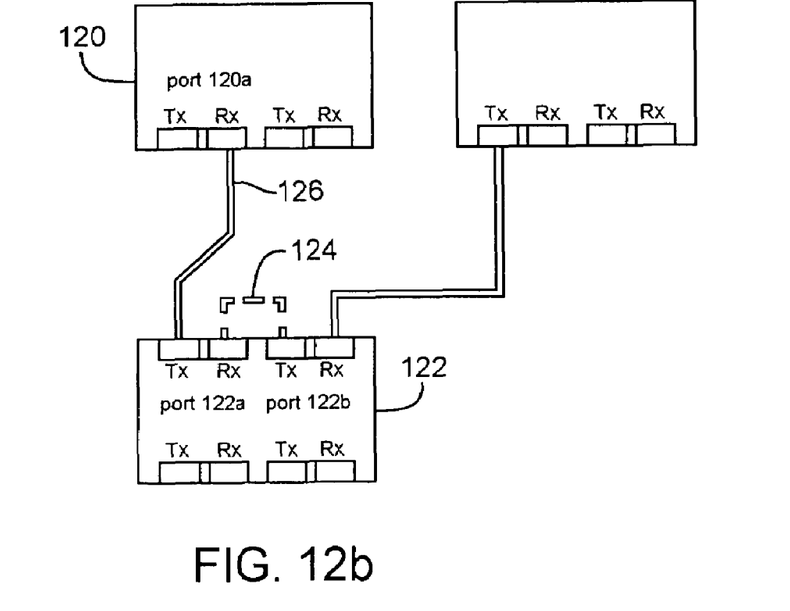
FIG. 12b is a schematic showing the devices of FIG. 12a with a unidirectional link connection.

FIGS. 12a and 12b show a situation in which a one-way link is not present until two active ports are connected. As shown in FIG. 12a, port 120a of device 120 is in communication with port 122a of device 122 through lines 124 and 126. In FIG. 12b, line 124 is disconnected from the transmitting connector Tx of port 120a and connected to the transmitting connector of port 122b, thus forming a transmitting/receiving loop between ports 122a and 122b of device 122. When line 124 is removed from port 120a (FIG. 12a) and before information in the cache table of device 120 is aged out, line 124 is connected to port 122b (FIG. 12b) and port 122a detects a linkup. Since the unidirectional link detection probe messages are sent from device 122 with the RSY bit set, the detection at device 120 is restarted as if device 122 were a new neighbor. Device 120 can therefore detect the unidirectional connection and disables port 120a before device 122 detects a unidirectional connection at port 122a and disables it.

Figure 13:
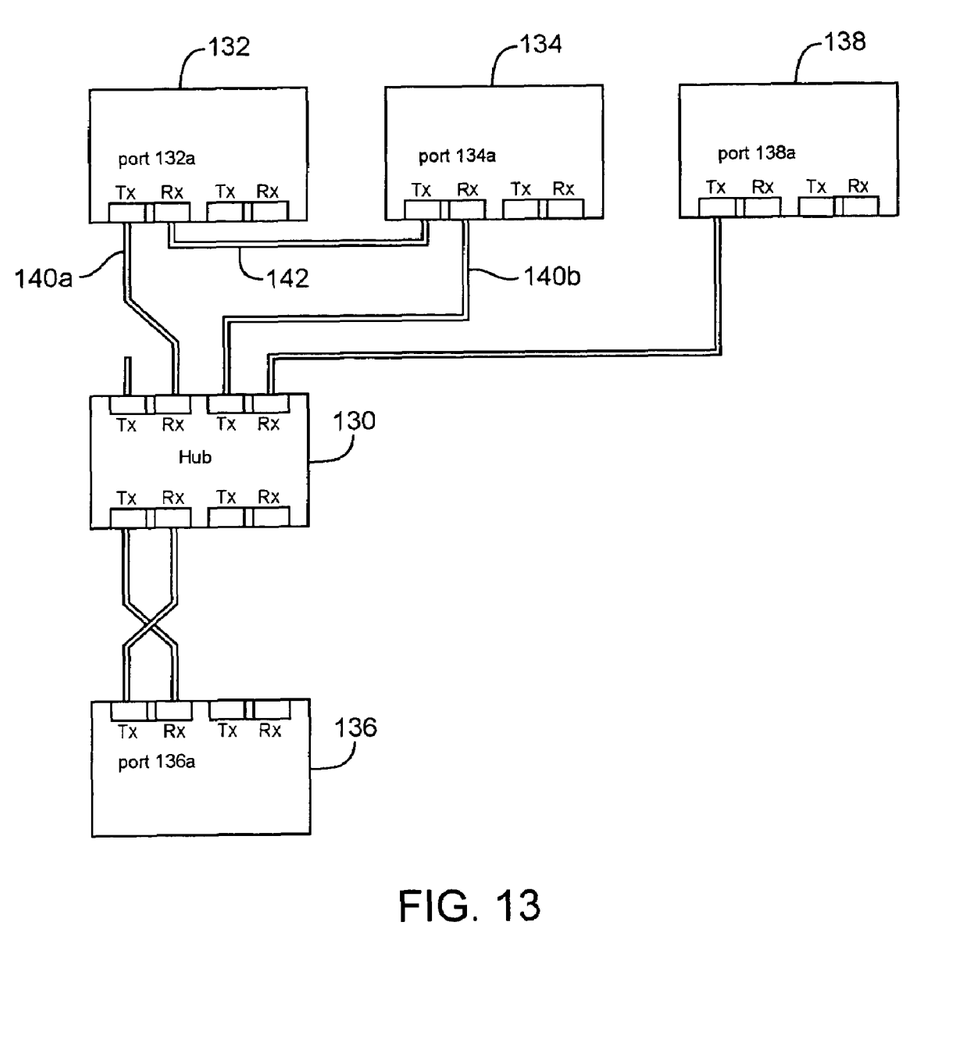
FIG. 13 is a schematic illustrating a second configuration of a miswired network.

FIG. 13 shows a one-way link present between two devices or switches (134, 138) connected by a hub 130. Devices 132 and 134 are connected bidirectionally through transmitting lines 140a and 140b, and receiving line 142. Device 136 can only transmit to device 134 and receive from devices 132 and 138. Device 138 has a broken wire on its receiving port 138a and is not in bidirectional communication with the other devices. Since device 132 has only one neighbor (device 134) listed in its cache table and it receives packets containing more than one device/port ID pair (device 134 and device 138), port 132*a* will be disabled.

Figure 14:
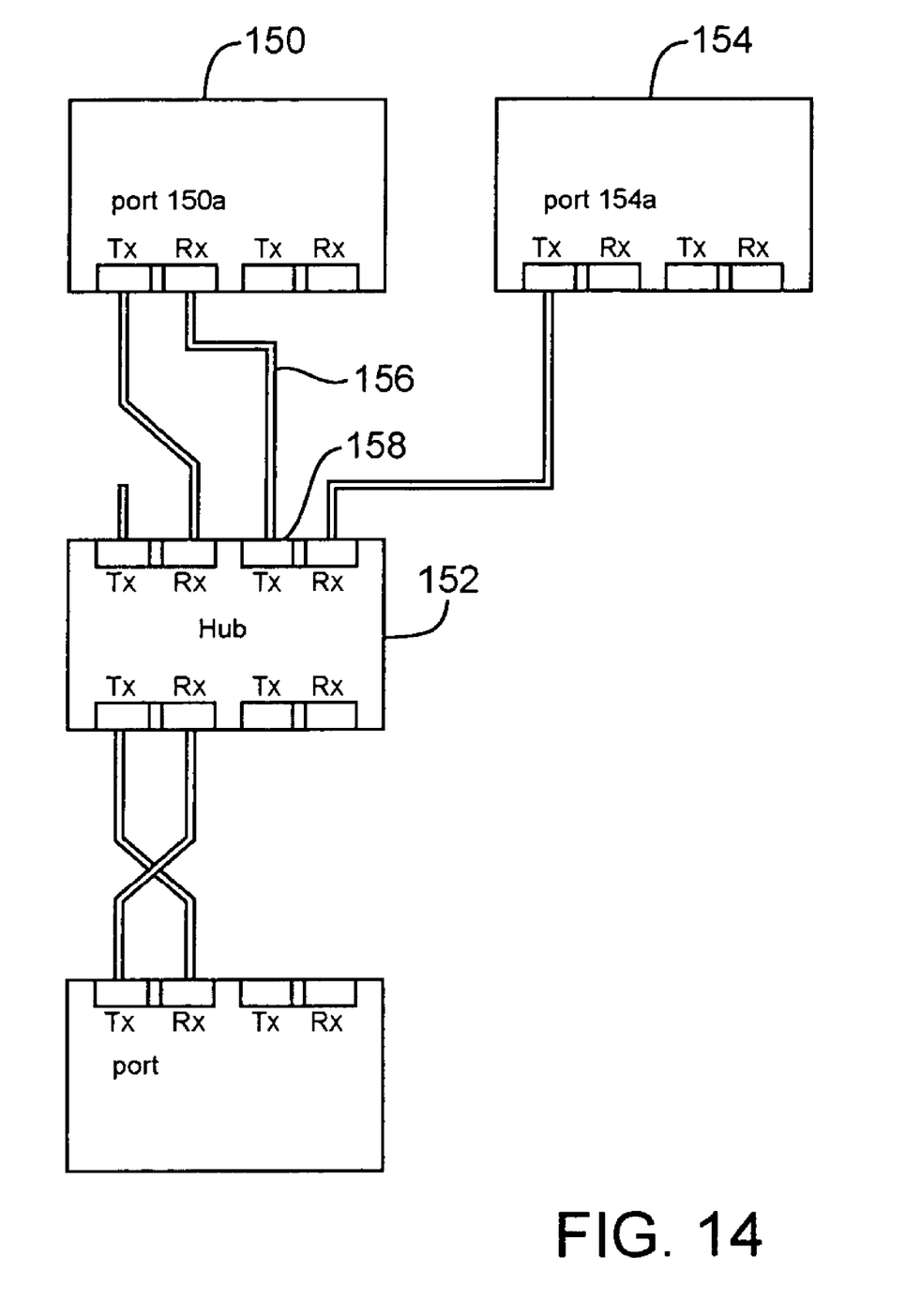
FIG. 14 is a schematic illustrating a third configuration of a miswired network.

FIG. 14 shows a miswiring which has created a unidirectional connection between fiber strands of the same port. When device 150 sends a probe message with its device ID as the originating identifier from port 150*a* it will travel through a hub 152 and back to port 150 since there is not a transmitting line extending from the hub to the device 154 and the line 156 is miswired. Device 150 will receive a reply message containing the device 150 ID in the originating device/port ID pair location and disable port 150*a* due to a transmitting/ receiving loop error. For example, the problem can be corrected by rerouting line 156 so that it is connected at the transmitting connector 158 of the hub 152 and at the receiving connector of port 154*a* of device 154. Also, the broken line between device 150 and the hub 152 should be fixed to connect the transmitting connector of hub 152 to the receiving connector of port 150*a*.

Figure 15:
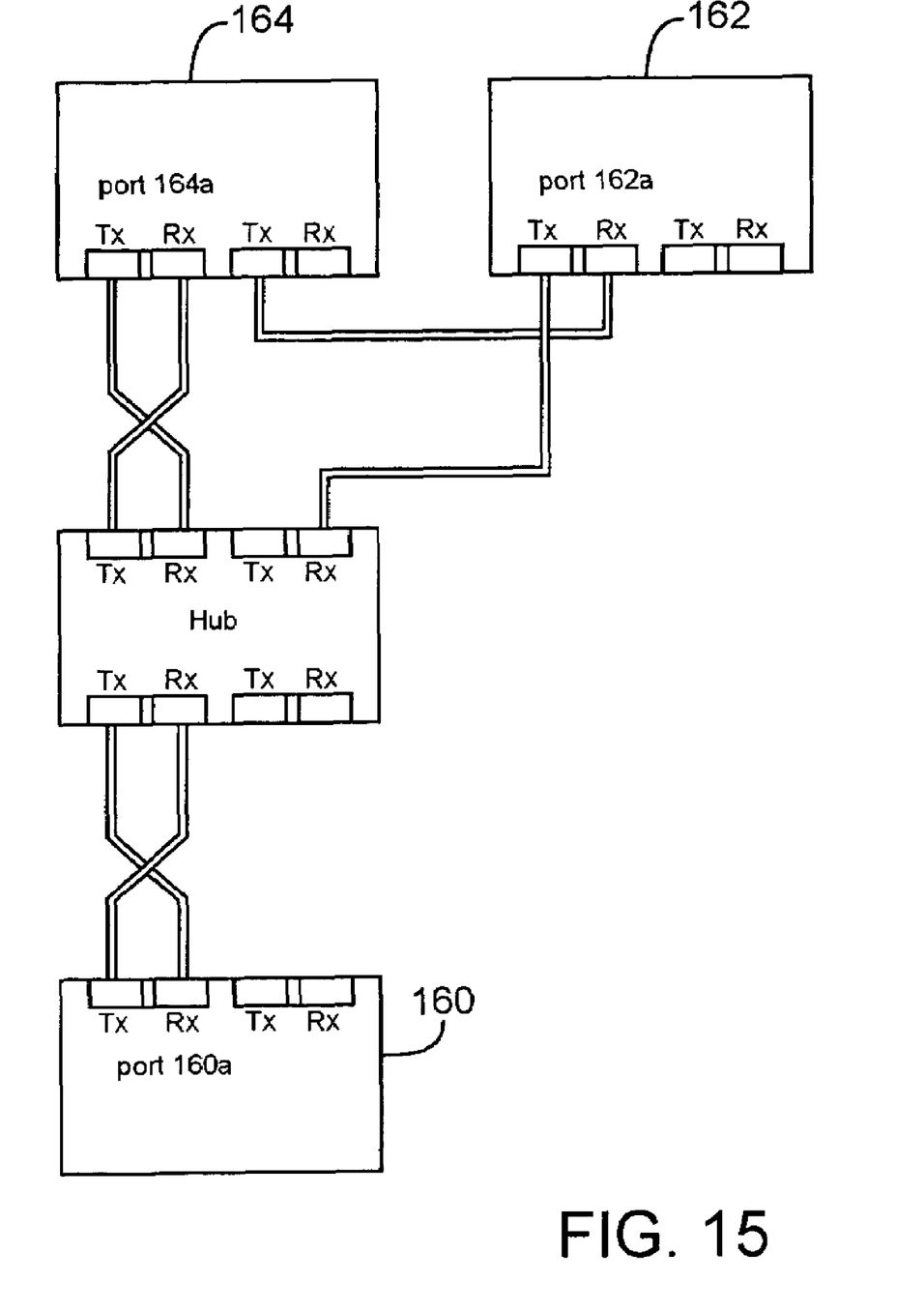
FIG. 15 is a schematic illustrating a fourth configuration of a miswired network.

In the system of FIG. 15, only device 160 initially has the unidirectional link detection protocol enabled. Thus, only device 160 is sending out probe messages and device 160 never receives messages from device 162 and 165. In this case, once the unidirectional link detection is enabled on devices 162 or device 164, a probe message from device 162 starts the detection on both devices 160 and 164 and the one way connection between devices 162 and 164 is discovered. Devices 160 and 164 will detect and report a problem on port 162*a* even though port 162*a* does not actually perform any detection.

It will be observed from the foregoing that the unidirectional link detection system has numerous advantages. The illustrated protocol identifies one-way connections between neighbors even when the physical layer has identified the transmission media as bidirectional. The system detects miswirings and disables one-way communication before it creates dangerous situations such as spanning tree loops.

In view of the above, it will be seen that several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of testing a primary device for two-way communication between the primary device and one or more neighbor devices in communication therewith in a network, the method comprising:
   inserting into an echo packet an originating device identifier in an originating device field and a primary device identifier in a primary device field;
   transmitting the echo packet containing the originating device identifier and the primary device identifier from the primary device; and
   receiving a reply packet at the primary device and detecting two-way communication if the reply packet contains the originating device identifier in the originating device field and the primary device identifier in the primary device field.

2. The method of claim 1 wherein receiving and transmitting the packet comprises receiving and transmitting the packet across a data link layer.

3. The method of claim 1 wherein receiving a reply packet further comprises detecting one-way communication if the reply packet does not contain one of the originating device identifier and the primary device identifier.

4. The method of claim 3 further comprising notifying a user of the primary device of the one-way communication.

5. The method of claim 3 further comprising notifying a network manager of the one-way communication.

6. The method of claim 1 wherein transmitting the packet further comprises starting a timer and setting a time limit for detecting two-way communication.

7. The method of claim 1 wherein receiving a packet and transmitting a packet comprises receiving a plurality of packets and transmitting a plurality of packets, respectively.

8. A system for testing a primary device for two-way communication between the primary device and one or more other devices in communication therewith in a network, the system comprising:
   a message generator configured to generate an echo message with an originating device identifier located in an originating device field and a primary device identifier located in a primary device field;
   a transmitter configured to transmit from the primary device the echo message containing the originating device identifier and the primary device identifier; and
   a receiver configured to receive a reply packet at the primary device and detect two-way communication if the reply packet contains the originating device identifier in the originating device field and the primary device identifier in the primary device field.

9. The system of claim 8 wherein the receiver receives messages from a data link layer and the transmitter transmits messages to the data link layer.

10. The system of claim 8 further comprising a cache table for storing the originating device identifier in the primary device.

11. The system of claim 8 further comprising an error message generator operable to generate a message that a one-way communication condition exists if the reply packet does not contain the originating device identifier in the originating device field.

12. The system of claim 8 wherein the primary device is in communication with the one or more other devices through a fiber medium.

13. The system of claim 8 wherein the primary device is in communication with the one or more other devices through fiber optic cable.

14. The system of claim 8 wherein the echo message generator is configured to generate a plurality of echo messages and the transmitter is operable to transmit the plurality of echo messages.

15. The system of claim 8 wherein the primary device is in communication with the one or more other devices through copper media.

16. The system of claim 8 further comprising a detector configured to detect an error selected from the group consisting of unidirectional link, bi-directional link, neighbor mismatch, and a loop.

17. The system of claim 8 wherein the device identifiers are encapsulated in a header of the packet.

18. A system for testing a primary device for two-way communication between the primary device and one or more other devices in communication therewith in a network, the system comprising:
   means for generating an echo message with an originating device identifier located in an originating device field and a primary device identifier located in a primary device field;
   means for transmitting from the primary device the echo message containing the originating device identifier and the primary device identifier;
   means for receiving a reply packet at the primary device and detecting two-way communication if the reply packet contains the originating device identifier in the originating device field and the primary device identifier in the primary device field.

19. The system of claim 18 wherein the receiver means receives messages from a data link layer and the transmitter transmits messages to the data link layer.

20. The system of claim 18 further comprising a cache table for storing the originating device identifier in the primary device.

21. The system of claim 18 wherein means for transmitting the packet further comprises means for starting a timer and setting a time limit for detecting two-way communication.

22. The system of claim 18 further comprising means for removing the originating device identifier from cache of the primary device after a predetermined period of time.

\* \* \* \* \*